US012400258B2

(12) United States Patent
Borth et al.

(10) Patent No.: US 12,400,258 B2
(45) Date of Patent: Aug. 26, 2025

(54) ENHANCED DATA DISPLAY INTERACTIONS

(71) Applicant: Truist Bank, Charlotte, NC (US)

(72) Inventors: Randy Eric Borth, Concord, NC (US);
Rajashekara R. Yellari, Charlotte, NC (US); WeiJen Lu, Raleigh, NC (US);
Candice Mercer Roberts, Harrisburg, NC (US)

(73) Assignee: TRUIST BANK, Charlotte, NC (US)

( * ) Notice: Subject to any disclaimer, the term of this patent is extended or adjusted under 35 U.S.C. 154(b) by 117 days.

(21) Appl. No.: 18/154,282

(22) Filed: Jan. 13, 2023

(65) Prior Publication Data
US 2024/0242270 A1    Jul. 18, 2024

(51) Int. Cl.
*G06Q 40/00*  (2023.01)
*G06Q 40/02*  (2023.01)

(52) U.S. Cl.
CPC .................... *G06Q 40/02* (2013.01)

(58) Field of Classification Search
CPC ........................................................ G06Q 40/02
See application file for complete search history.

(56) References Cited

U.S. PATENT DOCUMENTS

| 9,799,070 | B1* | 10/2017 | Barrett ............... G06Q 40/00 |
| 2013/0165238 | A1* | 6/2013 | Batista Jerez .......... A63F 13/30 463/42 |
| 2015/0072791 | A1* | 3/2015 | Batista Jerez .......... A63F 13/30 463/42 |
| 2016/0098755 | A1* | 4/2016 | Silvestro ............ G06Q 30/0258 705/14.58 |
| 2017/0094332 | A1* | 3/2017 | Thomas ............. H04N 21/2665 |
| 2022/0108378 | A1* | 4/2022 | Licare ............... G06F 16/90335 |
| 2023/0196226 | A1* | 6/2023 | DaCosta ................ G08G 1/005 705/7.15 |
| 2024/0037640 | A1* | 2/2024 | Brotherston ....... G06Q 30/0643 |

(Continued)

OTHER PUBLICATIONS

Understanding Antecedents Subscription Intentions for Video Streaming IEEE (Year: 2023).*

(Continued)

*Primary Examiner* — Bruce I Ebersman
(74) *Attorney, Agent, or Firm* — Michael A. Springs, Esq.; Shumaker, Loop & Kendrick, LLP; Patrick B. Horne

(57) ABSTRACT

A method and system for transaction data integration and enrichment in an online banking system. A first external source of transaction data is merged with a bank's transaction data into a combined database wherein entries in common data fields are resolved, and additional data fields are provided for each transaction. A second external source of transaction data may also be merged with the combined database, providing another option for common data fields, and further additional data fields. Other external data sources may include data describing external accounts, where all of the accounts are loaded in an aggregated database. The combined database and the aggregated database are presented to the customer where the transaction data is consistent across all data sources, each transaction record includes supplemental data from the external sources, actionable links are provided to external systems, and financial insights are enhanced by the external account data.

4 Claims, 10 Drawing Sheets

(56) References Cited

U.S. PATENT DOCUMENTS

2024/0070761 A1\* 2/2024 Waese ................ G06Q 30/0633
2024/0202803 A1\* 6/2024 Li ........................ G06F 40/295

OTHER PUBLICATIONS

Streaming of Governed Content—Time for a Standard, IEEE (Year: 2008).\*

A Secure Operational Model for Mobile Payments, PMC (Year: 2014).\*

Card-Present Transactions on the Internet Using the Smart Card Web Server, IEEE (Year: 2014).\*

\* cited by examiner

| JOHN A. SMITH | ACCOUNT # 4321 8888 7654 1234 | CURRENT TRANSACTIONS |

TRANSACTIONS

↓270  ↓272  ↓274  ↓276  ↓278

| Date | Status | Description | Category | Amount |
|------|--------|-------------|----------|--------|
| 07/15 | Pending | PETES PIZZA    EDINBURGH (280) | Food | -$26.54 |
| 07/13 | Posted | LNER    039756623 (282) | Travel | -$44.17 |
| 07/10 | Posted | Lesco Pharmacy    London | Health | -$8.47 |
| ... | ... | ... | ... | ... |
| 06/27 | Posted | HOME Warehouse #6378 (284) | Household | -$74.81 |
| 06/24 | Deposited | ABC Co. Pcx93187 | Paycheck | +$2100.39 |
| 06/21 | Posted | Sulu Streaming Subscr. (286) | Entertainment | -$22.22 |
| ... | ... | ... | ... | ... |

BALANCE    $1,763.55

ENHANCED DATA DISPLAY INTERACTIONS

FIELD

The present disclosure relates generally to the field of digital banking systems, and more particularly to a method and system for integrating data from multiple data sources, including resolving inconsistencies in common data fields and adding new data fields into relational tables, sending resolved data back to the data sources as needed, and providing enhanced display features and interactions related to the data from the multiple sources.

BACKGROUND

Digital banking systems are well known and used by many bank businesses and their customers. Two common types of digital banking systems are online web-based systems which interact with a user via a web browser window on a computer, and mobile applications ("apps") which run on mobile devices such as smart phones and tablets. Both online web-based banking systems and mobile banking apps communicate with back-end servers which validate and execute specific transactions, provide data for display, etc. Both web-based and mobile app-based systems also include security and customer authentication features, where user-provided information and/or biometric information is collected from the customer and validated with data stored on the back-end server. Digital banking systems, including web-based and mobile app-based systems, are often referred to as online banking systems, which terms will be used interchangeably throughout the present disclosure.

Each customer has one or more accounts with the bank, which the customer may access and manage. The accounts might include checking and/or savings accounts, credit cards, and possibly investment accounts or others. Customers typically receive periodic statements for each account—such as a monthly credit card statement—in which every transaction is listed (deposits, withdrawals, purchases, payments, etc.) and a new account balance is shown. Statements may be paper or electronic.

Customers who use a bank's digital banking systems also have access to near-real-time account information, where transactions are posted to the account ledger soon after the transaction's occurrence. For example, a credit card purchase at a coffee shop will often appear in the online transaction list for the credit card account within minutes of the purchase. This allows savvy online banking customers to regularly review their transaction list (e.g., to spot potential fraud) and also to keep track of their current account balance. These online transaction lists directly access data from a transaction database, and may be updated many times each day. By contrast, the account statements (described above) are produced only at the close of a statement period—such as monthly.

Each transaction in an online account transaction list includes a date and an amount of the transaction, along with information about the payer or payee. For example, in the case of the purchase at the coffee shop, the name of the shop and often the location of the shop (e.g., city) will be displayed along with the date and the purchase amount. Other transaction information is also sometimes displayed—such as a transaction ID number, an indication of how the purchase was made (online or in-person) and/or a brief description of the purchase.

With increasing numbers of bank customers using online banking systems, there is an expectation that the data displayed in those systems is not only readily understandable, but is also consistent with other systems that the customer may use, and is intelligently linked to other systems so that the customer can take actions related to certain transactions as needed. However, existing online banking systems often display transactions with abbreviations and other cryptic elements which make the transactions difficult to decipher, and transaction lists in online banking systems may contain some fields with data which is inconsistent with other digital financial systems which reflect the same transaction.

In view of the circumstances described above, there is a need for an online banking system which integrates transaction data from multiple data sources and displays the data to the customer in a way which improves clarity, generates insights, and enables the customer to take actions related to particular transactions.

BRIEF SUMMARY

The present disclosure describes a method and system for transaction data integration and enrichment in an online banking system. A first external source of transaction data is merged with a bank's own transaction data to create a combined database in which entries in common data fields are resolved to reflect the most informative entry, and additional data fields are provided for each transaction record. A second external source of transaction data may also be merged with the combined database, providing another option for the entry in some common data fields, and providing further additional data fields. The second or other external data sources may also include data describing accounts not held at the bank, where all of the accounts are loaded in an aggregated database. The combined database and the aggregated database are presented to the customer in a manner in which the transaction data is consistent across all data sources, each transaction record includes supplemental data from the external sources which enriches the transaction data, actionable links are provided to external systems, and financial insights are enhanced by the availability of external account data.

The features, functions, and advantages that have been discussed may be achieved independently in various embodiments of the present disclosure or may be combined in yet other embodiments, further details of which can be seen with reference to the following description and drawings, along with the appended claims.

BRIEF DESCRIPTION OF THE DRAWINGS

FIG. 2 is a mock-up illustration of a computer display screen running a digital banking application in a web browser, depicting a transaction list portion of an account page, as known in the art;

DETAILED DESCRIPTION OF EMBODIMENTS

Figure 1:
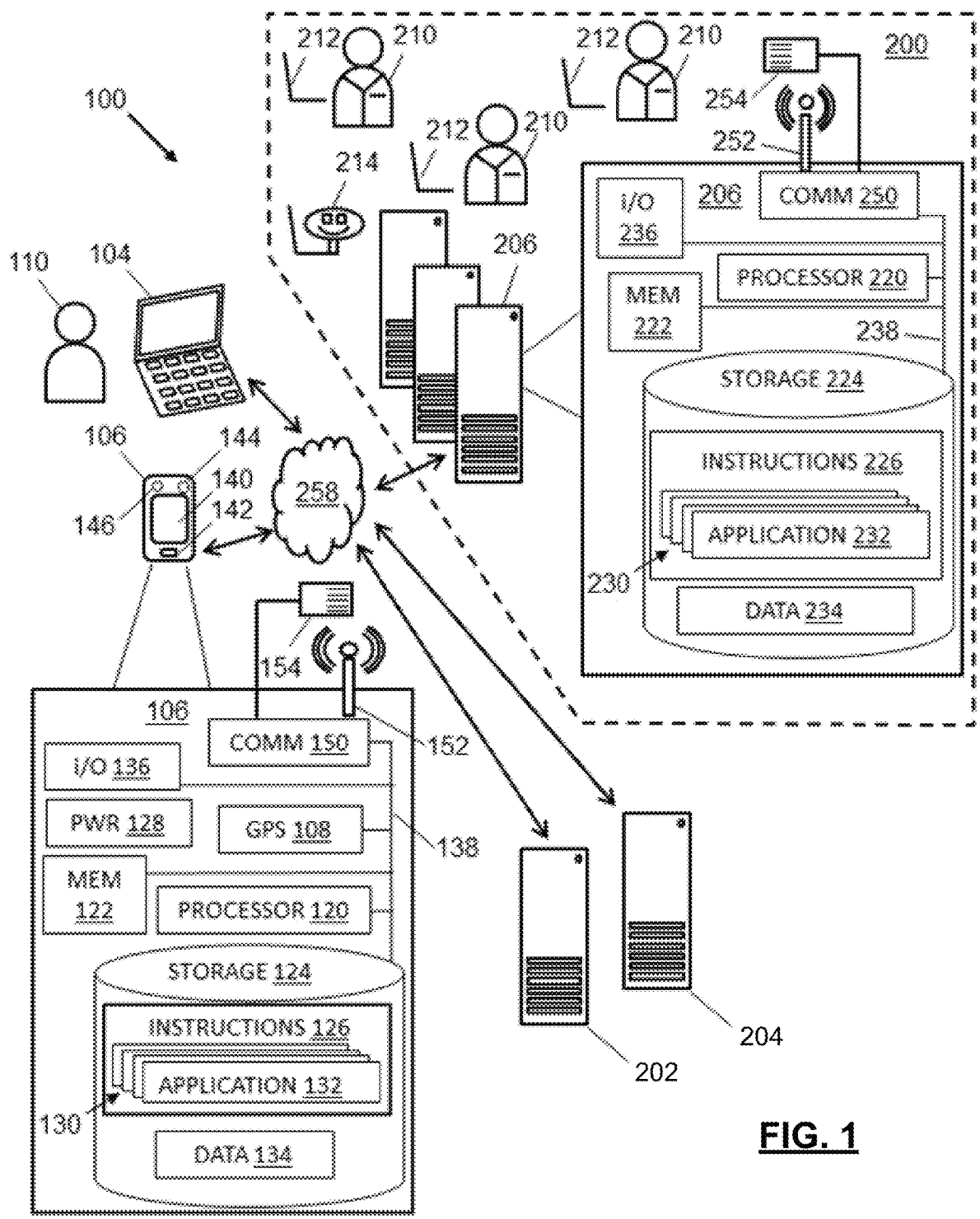
FIG. 1 illustrates an enterprise system, and environment thereof, including a centralized server system, distributed computers and mobile devices, and communication therebetween, according to at least one embodiment of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, including centralized and distributed computing devices, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action.

The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

Having described an enterprise computing environment as might be used by a banking business, and general characteristics of systems which may be employed in the enterprise computing environment, attention is now turned to the topic of database integration from multiple disparate sources and transaction data display enrichment in connection with digital banking.

Digital banking systems are well known and used by many bank businesses and their customers, including online web-based systems which interact with a user via a web browser window, and mobile applications ("apps") which run on mobile devices such as tablets and smart phones. Both online web-based banking systems and mobile banking apps communicate with back-end servers which validate and execute specific transactions, provide data for display, etc.

Banking customers have at least one account, and often more than one account, with a bank business. These accounts may include savings accounts, checking accounts, credit cards, etc. Customers receive a statement for each account, typically once per month. The statement lists a beginning balance, all transactions for the statement period, and an ending balance, among other things. Online banking systems also typically provide customers with access to near-real-time transaction lists for each account, where transactions appear in the online system as soon as they are posted to the bank's back end database; these will be referred to herein as online transaction lists.

As an increasing number of bank customers use online banking systems, there is an opportunity to enable the customers to interact with their online transaction lists in new ways—including allowing individual customers to assign values to certain data fields in a manner of their choosing, and taking other actions associated with some transactions.

In addition, databases are available from third party sources which contain supplemental data related to the transactions in the bank customers' online transaction lists. This supplemental data can be integrated with the bank's transaction database in a way which allows the supplemental data to be displayed and interacted with by the customer using the online banking system. Furthermore, the data from external data sources may describe the same transactions included in the bank's transaction list but with different values contained in some data fields. Rationalization of the common data fields is necessary in order to improve the customer's experience.

The techniques of the present disclosure describe methods for integrating data from multiple disparate sources, resolving inconsistencies in common data fields, adding supplemental data from the external sources to the bank's own database to create a combined and rationalized database, and providing interactive display features in online banking systems which enable the customer to view and interact with all of the data in the combined database. These features and functions provide the customer with the ability to explore the details of any individual transaction, and also provide the customer with financial insights which reflect the customer's account holdings at the bank along with the customer's accounts at other financial institutions.

FIG. 2 is a mock-up illustration of a computer display screen 258 running a digital banking application in a web browser, depicting a transaction list 260 for an account, as known in the art. It is known for online banking systems to provide transaction lists which include up-to-the minute transaction data for a particular account. FIG. 2 depicts an online transaction lists in a format which might be typical of an existing online banking system, with data fields which customers could expect to see. Enhancements of the transaction list 260 with additional features and functions are depicted in later figures and discussed below.

The display screen 258 of FIG. 2 is part of or communicates with a computer which corresponds with the computing device 104 of FIG. 1, and it is to be understood that the computer and display screen 258 of FIG. 2 communicate with a back-end server such as the computing system 206 of FIG. 1, by way of communications channels such as WiFi and/or cellular communication networks as illustrated by the network 258 ("the cloud") of FIG. 1.

The transaction list 260 could be for a credit card account, checking account (with or without a debit card), a savings account or any other type of account. The transaction list 260 as depicted represents a checking account, where debits and charges are listed with a negative value, and deposits are listed with a positive value.

At the top of the page in FIG. 2, information about the account to which the transaction list refers is provided—including the accountholder's name, an account number, and an indication of whether the listed transactions are for a current statement period or a prior period. As would be understood by those familiar with online banking, the user/customer could find other account information and take a variety of actions, other than viewing the transaction list 260, once logged into the online banking system.

The transaction list 260 is shown as having five columns—a transaction date column 270, a status column 272, a transaction description column 274, a category column 276 and a transaction amount column 278. The data contained in the columns 270-278 would be familiar to those acquainted with online banking systems, and some of these data elements are discussed further below. It is to be understood that the transaction list 260 may have more or fewer columns, different arrangements of columns, etc., without affecting the scope of the current discussion.

As would be understood by anyone familiar with bank account and credit card transaction lists, the entries in the transaction description column 274 may have a wide variety of formats. On credit card and debit card (check account) statements particularly, the transaction description typically lists the name of the merchant where the purchase was made and oftentimes lists a location such as a city. Sometimes the city is omitted and other information is added. Abbreviations, mixed upper- and lower-case text and numbers may be included in the transaction descriptions. A few examples of these variations in transaction description are illustrated in FIG. 2 and are discussed below.

A transaction description 280 is a typical description which is easy to understand, listing the full name of an establishment and a city. A description 282 is just the opposite, listing an abbreviated name of a merchant and a number which in this case is a ticket number. Some customers may look at the description 282 and not remember what "LNER" is, and think that this is a fraudulent charge. A description 284 is simple and easy to understand, although the customer may not remember what this particular purchase was. A description 286 refers to a subscription payment, about which the customer may want to learn more. The transaction list 260 ends with a current balance for the checking account.

The transactions shown on the transaction list 260 of FIG. 2 are merely a small representative sample. Other transactions have been omitted, as indicated by the rows of ellipses. In some instances, the transaction list 260 may be quite lengthy, requiring scrolling up and down to see all of the transactions. The web browser-based transaction list 260 of FIG. 2 is provided as a basis for the later discussion of the techniques of the present disclosure—where the display of some of the transactions is enhanced with additional data to improve the customer's understanding and the quality of the overall online banking experience.

Figure 3:
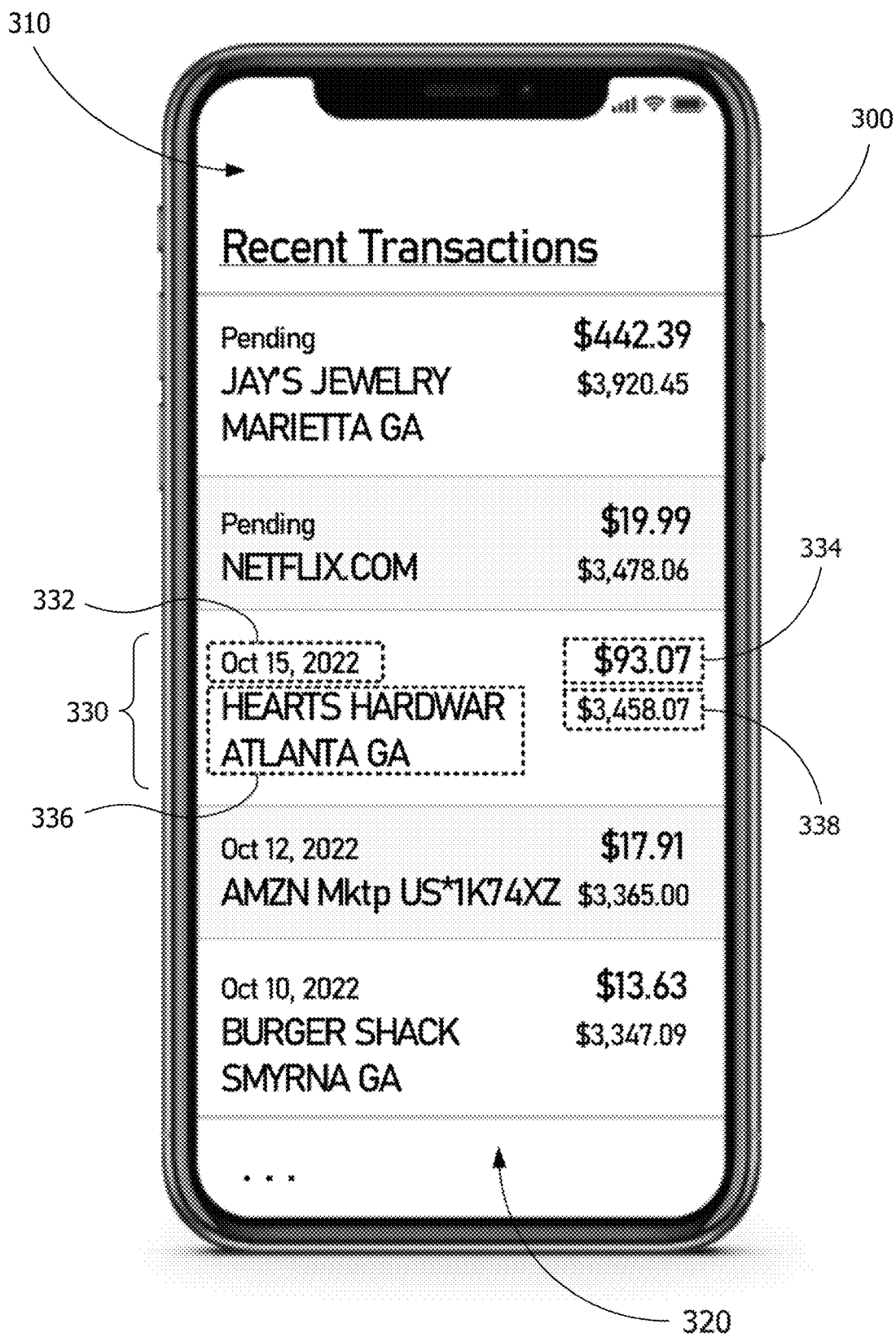
FIG. 3 is a mock-up illustration of a display screen of a mobile device running a digital banking application, depicting a transaction list portion of an account page, as known in the art.

FIG. 3 is a mock-up illustration of a display screen of a mobile device 300 running a digital banking application, depicting a transaction list portion of an account page, as known in the art. The mobile device 300 of FIG. 3 corresponds with the device 106 of FIG. 1, and it is to be understood that the mobile device 300 communicates with a back-end server such as the computing system 206 of FIG. 1, by way of communications channels such as WiFi and/or cellular communication networks as illustrated by the network 258 ("the cloud") of FIG. 1.

The mobile device 300 has a display screen 310 which serves as an input/output (I/O) device and user interface for user interaction with applications (apps) which run on the device 300. In FIG. 3, a simplified mock-up of a digital banking app is shown. In particular, a transaction list 320 is displayed. The transaction list 320 depicted in FIG. 3 is similar to the transaction list 260 of FIG. 2, including recent transactions which have been performed in an account that is currently being viewed in the digital banking app. FIG. 3 depicts transactions for a credit card account, as opposed to the checking account of FIG. 2. The customer can scroll up or down to view other transactions, as indicated by the ellipsis.

The transaction list 320 shown in FIG. 3 is illustrated as being displayed on the mobile device 300, particularly a smart phone, merely to make that point that the techniques of the present disclosure—enhancement of transactions with additional data—may be applied to both web-based online banking systems as depicted in FIG. 2 and app-based online banking systems as depicted in FIG. 3. The formats of the transaction lists may vary based on the size and shape of the display device (computer monitor vs. smart phone screen), but all of the transaction data is available regardless of format, and also regardless of the type of account (e.g., checking, savings, or credit card).

The transaction list 320 shows five transactions, including a transaction 330 which is discussed as representative. The transaction 330 includes a date in box 332, which corresponds with the date on the transaction list 260 of FIG. 2. For very recent transactions which have not been fully completed and validated, the word "Pending" may be displayed instead of a date. A transaction amount (e.g., amount of purchase) is shown in box 334. A transaction description is shown in box 336; this is the information which was shown in the transaction description column 274 and discussed above in connection with FIG. 2. The transaction description in the box 336 includes a truncated word, representative of the many different types of abbreviations and cryptic information which may appear in a transaction description, which often lead a customer to desire additional information about the transaction in question. A new account balance is shown in box 338; this is the new balance of the account including the transaction amount which appears above it in the box 334. Because the transaction list 320 of FIG. 3 is intended to depict a credit card account, the new account balance gets higher with each new purchase (going up the list).

Pursuant to the foregoing discussion of the transactions included in the transaction list 260 and the transaction list 320, many different scenarios may be envisioned where a customer wants to learn more information about a transaction. Data from external sources, that is data other than the bank's own existing database of transaction data, may be integrated into a combined database that includes supplemental data about each transaction. The integration of the external data sources and the display of the resulting combined database are the subject of the techniques of the present disclosure.

The following discussion is organized in two parts. The first part (FIGS. 4-6) is directed to the integration of multiple data sources into a single combined database. The second part (FIGS. 7-8) is directed to enhanced display of transaction data in transaction lists of online banking systems. Flowchart diagrams are later provided (FIGS. 9-10) which describe the methods of integrating data sources and displaying enhanced transaction data, respectively.

Figure 4:
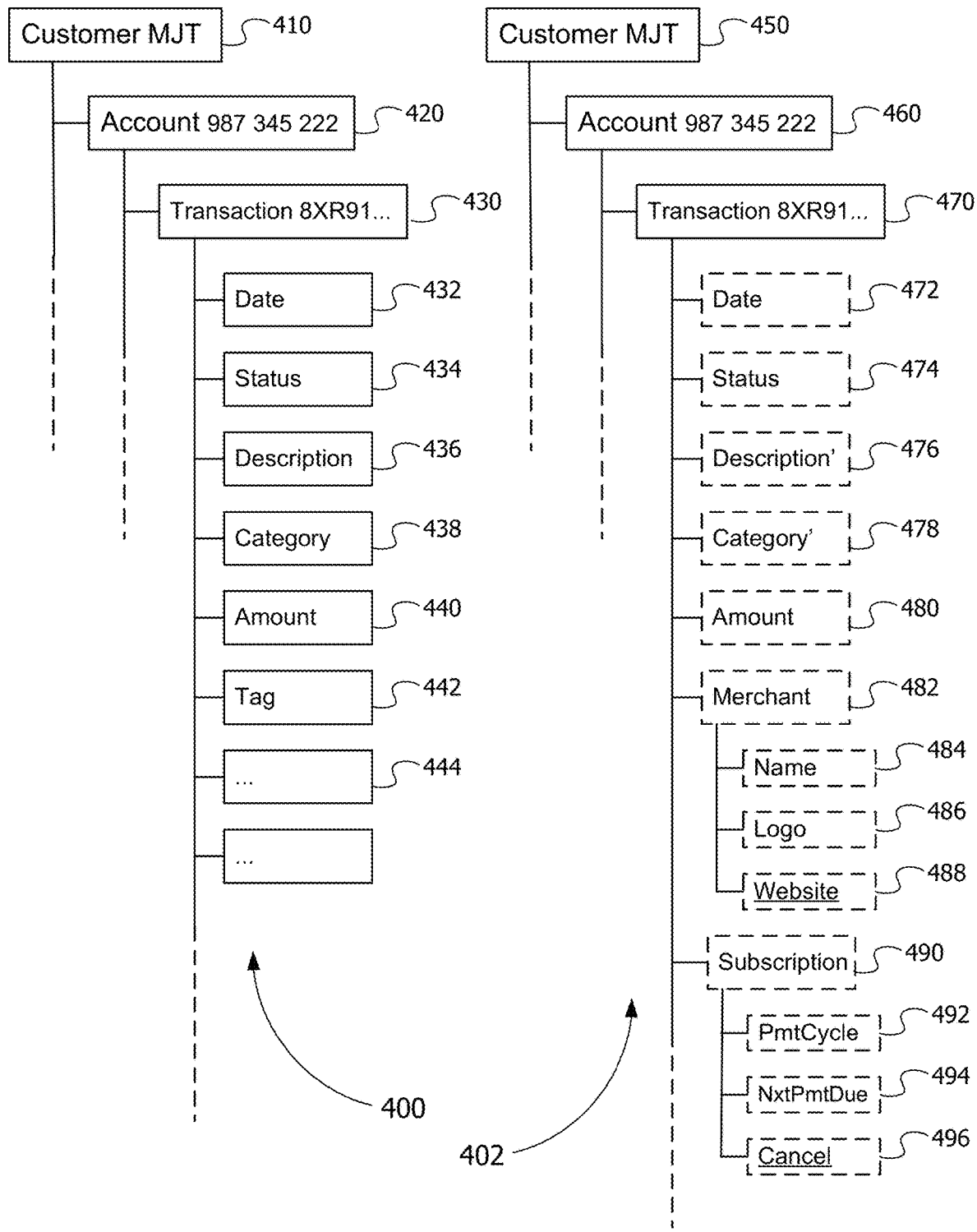
FIG. 4 is a schematic illustration of transaction data fields in databases from first and second data sources, including common data fields with different values which must be resolved and supplemental data fields from the second data source which are not included in the data table of the first data source, according to an embodiment of the present disclosure.

FIG. 4 is a schematic illustration of transaction data fields in databases 400 and 402 from first and second data sources, respectively, including common data fields with different values which must be resolved and supplemental data fields from the second data source which are not included in the data table of the first data source, according to an embodiment of the present disclosure.

The database 400 represents the bank's own data for a customer account. A customer 410 (shown with fictitious identifier initials) may have several accounts with the bank, such as a savings account, a checking account which may have an associated debit card, one or more credit card accounts, etc. An account 420 (with a fictitious account number) is shown as belonging to the customer 410. The other accounts, if they exist, would be linked to the customer 410 via the solid/dashed line which descends from the customer 410. This is the format for depicting relationships of data records and fields which is used in FIGS. 4-6.

The account 420 would normally include a large number of transactions, as discussed earlier in connection with FIGS. 2 and 3. A transaction 430 (with a fictitious transaction identification number) is shown as belonging to the account 420. The transaction 430 might be an individual purchase, a regular monthly automatic payment, or some other type of transaction. Other transactions would be linked to the account 420 via the solid/dashed line which descends from the account 420.

Several data fields are related to the transaction 430, including a date field 432, a status field 434, a description field 436, a category field 438 and an amount field 440. Each of the data fields 432-440 was shown in FIG. 2 and/or FIG. 3. A tag field 442 is a customer-definable field which allows customers to group certain transactions for list sorting and analysis functions discussed later. Various other data fields, represented by a field 444, may exist for the transaction 430.

The database 402 represents data from a second source, separate from the bank itself, for a customer account. Standards for customer and account identification exist in the financial industry which enable customer and account data from one source (e.g., the bank) to be matched up with corresponding customer and account data from another source (external to the bank). In the database 402, each data record and field is given a unique reference number, although certain records or fields in the database 402 correspond (either identically or similarly) with a record or field in the database 400. This is discussed below.

A customer 450 and an account 460 are identically the same as the customer 410 and the account 420, respectively. The industry-standard identifiers are matched up to determine that the data for the account 460 in the database 402 refers to the same transactions as the data for the account 420 in the database 400. Following this same logic, the transaction 470 is the same transaction (such as a purchase or a subscription payment) as the transaction 430. The data fields belonging to the transaction 470 in the database 402 are contained in boxes with dashed outlines, for visual distinction from the data fields from the database 400.

Several data fields are related to the transaction 470, including a date field 472, a status field 474, a description field 476, a category field 478 and an amount field 480. Each of the data fields 472-480 has a corresponding data field in the database 400. Some of the corresponding data fields in the databases 400 and 402 may have exactly the same value, and some may have different values. For example, the transaction date and amount would be expected to have the same values in the databases 400 and 402, as these are matters of fact. The transaction status may have a different value in the two databases, depending on timing of the database updates. That is, if the database 402 was populated twelve hours ago and the database 400 has live up-to-the-minute data, the status field 434 might indicate posted while the status field 474 indicates pending.

The description field 436 might well be somewhat different from the description field 476 (depicted in the figure with a "prime" symbol), as the source of the database 402 may use a different algorithm for creating a description (as a combination of merchant name, merchant location, transaction identifier, etc.) than does the bank itself. Similarly, the category field 438 might well be different from the category field 478 (also depicted in the figure with a "prime" symbol), as the source of the database 402 may use a different algorithm for assigning a category (such as "home improvement" vs. "household") than does the bank.

The transaction 470 in the database 402 also contains additional data fields which are not included in the database 400. A merchant field 482 includes data not available in the database 400. The merchant field 482 includes a plurality of its own related fields, including a merchant name 484, and merchant logo 486 and a merchant website link 488. A subscription field 490 also includes data not available in the database 400, for the case where the transaction 470 is a monthly subscription payment. The subscription field 490 includes a plurality of its own related fields, including a payment cycle field 492, a next payment due date field 494 and a cancel link 496.

According to the techniques of the present disclosure, there may be other databases, besides the databases 400 and 402, which are processed similarly. That is, an additional database (not shown) could come from an external data source which is different than the source of the database 402. The additional database would again have overlapping data fields associated with each transaction, and may have supplemental data fields which could be incorporated into a combined database. This merging and combination of data from multiple sources is discussed with respect to FIGS. 5 and 6.

Figure 5:
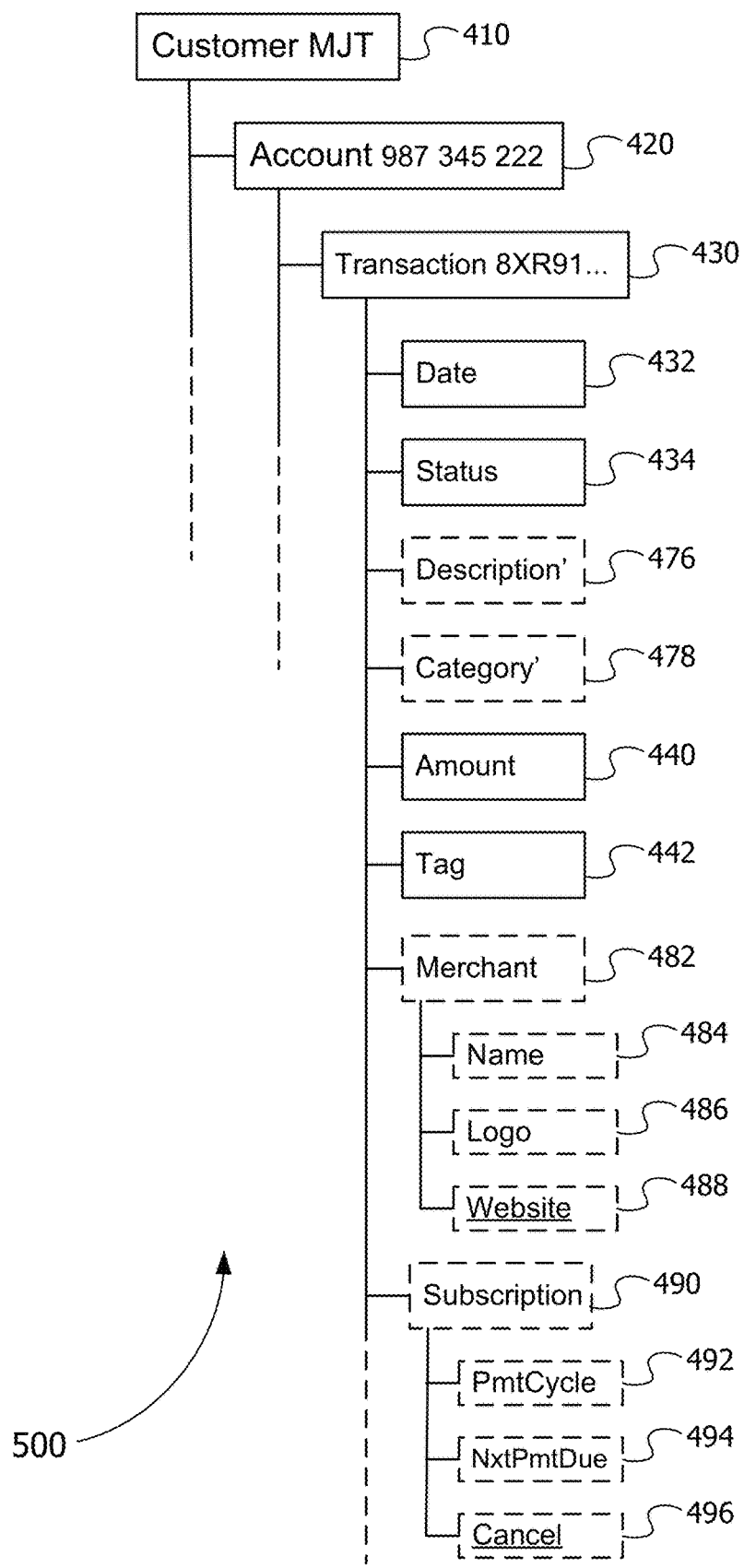
FIG. 5 is a schematic illustration of a customer account with transaction data fields in a combined database selectively using data fields from the databases of FIG. 4, according to an embodiment of the present disclosure.

FIG. 5 is a schematic illustration of a customer account with transaction data fields in a combined database 500 which selectively uses data fields from the databases 400 and 402 of FIG. 4, according to an embodiment of the present disclosure. In the preceding discussion of FIG. 4, the databases 400 and 402 contained a combination of data fields with identical values, data fields with similar but possibly different values, and data fields with no corresponding item in the other database. The database 500 of FIG. 5 assembles the data from the databases 400 and 402 in a manner which makes the most and best transaction data available to the online banking customer.

The customer 410, the account 420 and the transaction 430 were all found in the database 400, which is the bank's own transaction database, and each of these records also exists identically in the database 402, as shown in FIG. 4 and discussed above. In the database 500, some of the data fields related to the transaction 430 come from the database 400, and some come from the database 402.

In the combined database 500, the transaction date field 432 has a value taken from the database 400, although the value in its corresponding date field 472 should be identical. Similarly, the transaction amount field 440 has a value taken from the database 400, although the value in its corresponding date field 480 should be identical. The transaction status field 434 has a value taken from the database 400, as this status value is likely to be most current. In contrast, the values of the transaction description and category data fields are taken from the database 402, including a description field 476 (description') and a category field 478 (category'). Various reasons may exist for taking the transaction description and category data values from the database 402. For example, the external source which provides the database 402 may have a business relationship with merchants which enables the external source to receive more robust transaction description and categorization data than is available in the basic financial reporting of the transaction which the bank itself receives.

The tag field 442 is taken from the database 400, as there is no corresponding field in the database 402. As discussed earlier, the tag is a value that the customer may assign to a transaction, in the bank's online banking systems, to group certain transactions in a manner that the customer finds helpful.

The merchant data (482-488), including the merchant name, logo and website link, are all taken from the database 402, as this data is not available in the database 400. Similarly, the subscription data (490-496), including the subscription payment cycle, next payment due date and cancellation link, are all taken from the database 402, as this data is not available in the database 400.

As mentioned above, there may be more than two databases that are integrated into the combined database 500 as shown in FIG. 5. In fact, the present disclosure anticipates at least one more database from a third data source, containing transaction data for the same customer account 420, with data fields selectively identified from each of the three databases in a database integration algorithm, to create the combined database 500.

The database 500 shown in FIG. 5 and discussed above, indicating which data fields are taken from the database 400 and which are taken from the database 402, is merely exemplary. In another example, the category data may be taken from the database 400 (category field 438) rather than from the database 402. The point is that transaction data fields may be taken from two or more disparate data sources and combined into a database which is a superset of all of the data fields of the source databases and which includes values in each common data field which are selected by the database architect based on their containing the most current data, the most descriptive data, data not included in the database provided by the other source, or some similar criteria. Usage of the database 500 in providing enriched transaction data detail to the customer in the bank's online banking systems is discussed below.

Other customer accounts held at the bank (e.g., savings account, credit card account) may be enhanced with data from external sources in the same manner as the account 420.

Figure 6:
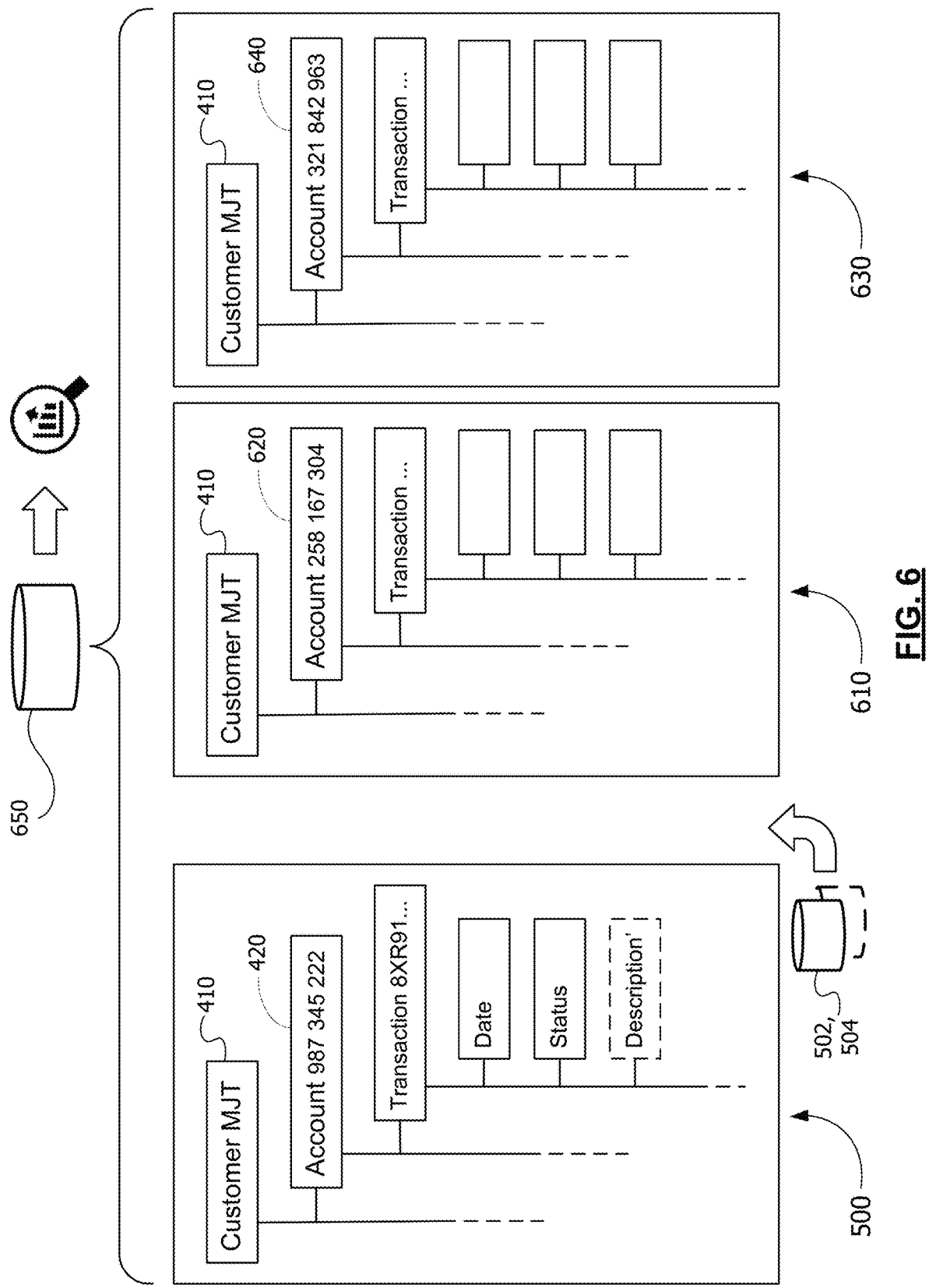
FIG. 6 is a schematic illustration of the customer account from the combined database of FIG. 5, along with two other accounts for the same customer but from different financial institutions and from a different data source, where all of the customer's accounts are available to view and analyze from a single online banking system, according to an embodiment of the present disclosure.

FIG. 6 is a schematic illustration of the customer account from the combined database 500 of FIG. 5, along with two other accounts for the same customer but from different financial institutions and from a different data source, where all of the customer's accounts are available to view and analyze from a single online banking system, according to an embodiment of the present disclosure.

The database 500 at the left in FIG. 6 includes the account 420 for the customer 410, with data combined from the database 400 and the database 402, and was discussed above with respect to FIG. 5. It is to be understood that the database 500, or other databases (502, 504, . . . ) contain data for other customer accounts held at the bank which manages the database 500. In other words, if the customer has several accounts at the bank, all of those accounts are represented in the account aggregation depicted in FIG. 6. A database 610 from a data source external to the bank, and generally different from the source of the database 402 of FIG. 4, includes data for an account 620 which belongs to the same customer 410 as the account 420. A database 630 from a data source external to the bank, and which may be the same or different from the source of the database 610, includes data for an account 640 which also belongs to the same customer 410 as the account 420. In one embodiment, the databases 610 and 630 are both provided by the same external source, even though the account 620 (in the database 610) and the account 640 (in the database 630) are held in different financial institutions.

The customer account 420 is a checking account and was discussed at length with respect to FIGS. 4 and 5. The customer may have other accounts such as savings and credit card accounts at the bank, and these are also provided in the database 500 or the databases 502/504. The account 620 might be an investment account which the customer 410 has with a financial institution different than the customer's "everyday" bank (where the customer's checking and savings accounts reside). The account 640 might be a credit card account from yet another financial institution, as many consumers have multiple credit cards with different reward features and from different issuers. Thus, a customer having accounts with multiple financial institutions is a fairly common situation. In fact, there could be many different accounts from many different financial institutions. For example, some consumers have several credit cards from different issuers, and some consumers have checking and savings accounts with two or more financial institutions in order to maintain their deposits with each financial institutions under the FDIC insurance limits. The total number of accounts could therefore be in a range of five to ten, or even more.

The databases 500, 502/504, 610 and 630 (and others if applicable) are loaded into an aggregated database 650. In the database 650, each customer account is maintained separately. The database integration depicted in FIG. 6 is different than that depicted in FIG. 5. In FIG. 5, two or more different sources of data for the same account were integrated at the transaction level, thus enriching the data for individual transactions within the account. In FIG. 6, multiple data sources provide data for different accounts belonging to the same customer. The data from the multiple accounts in FIG. 6 is not integrated or merged for transactions within an account, but rather is aggregated for multiple accounts which can then be viewed and analyzed in total for the customer.

The type of database integration depicted in FIG. 6—with a customer's account data from multiple financial institutions—is beneficial to the customer because it provides a complete "big picture" view of the customer's finances which enables analysis and insights which would otherwise be unavailable. This includes cash flow analysis, total customer spending for a particular category or merchant across multiple cards/accounts, retirement planning, and so forth. This provides a holistic financial picture for the customer in a digital banking system with which the customer is already familiar.

Figure 7:
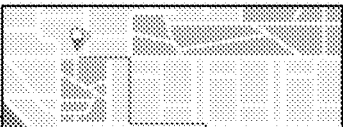
FIG. 7 is a mock-up illustration of a digital banking application in a web browser, depicting a transaction list where a detail view of a transaction is provided with supplemental merchant data from the second data source of FIG. 4, according to an embodiment of the present disclosure.

FIG. 7 is a mock-up illustration of a digital banking application in a web browser, depicting a transaction list 700 where a detail view of a transaction is provided with supplemental merchant data from the second data source of FIG. 4, according to an embodiment of the present disclosure. The transaction list 700 of FIG. 7 includes the same transactions as the transaction list 260 of FIG. 2. Also like FIG. 2, the transaction list 700 of FIG. 7 is depicted as being displayed on the computer display screen 258. The transaction details shown in FIG. 7 represent one example of transaction data enrichment which is provided by the database integration and user interface features of the present disclosure.

In the transaction list 700, a detail view 710 is provided for the transaction 284 (from FIG. 2). The detail view 710 could be displayed when the user clicks somewhere on the transaction 284, clicks on an "expand" or down-arrow icon, hovers over the transaction 284, or via any other suitable user interface action programmed into the online banking system. The detail view 710 includes the basic information about the transaction 284 which was available in the line-item display of the transaction list 260, plus significantly more information about the transaction 284, and offers actions which the user/customer may take in connection with the transaction 284.

Some of the data which appears in the detail view 710 is from the bank's own transaction database 400 of FIG. 4, while some of the data in the detail view 710 came from the database 402 provided by an external source. All of the data in the detail view 710 resides in the combined database 500 of FIG. 5. This includes data fields which are user-modifiable in the detail view 710, such as the tag and the category.

In one design embodiment, the detail view 710 includes a top bar 720 containing most of the readily identifiable information about the transaction 284 which is included in the transaction list itself. This includes the transaction date, the description, the category and the transaction amount. Alongside the description, which contains the merchant name, the merchant logo is added in the top bar 720, as indicated at 722. The merchant logo is available in the database 500, having been provided in the database 402 from the external source, as discussed earlier. In some embodiments, the line item display of the transaction 284 (inside the dashed box in FIG. 7) is eliminated when the detail view 710 of the transaction 284 is displayed.

In the design embodiment shown in FIG. 7, along the left side are more details about the transaction 284. These include the posted date, the transaction type which in this case is a debit, and a "Paid From:" field which in this case shows a Visa debit card with the last four digits of the card number. At the bottom left of the detail view 710 is the tag field, in this case identifying the transaction as "Kitchen Project". The tag data field is user-definable, enabling the customer to group transactions in any manner that is helpful to the customer. The Kitchen Project tag, for example, can be used to tag purchases from many different merchants (flooring store, plumbing supply store, appliance store, installation contractors, etc.) related to a kitchen renovation project. All transactions related to the project can later be conveniently viewed and totaled by the customer, so that the total expense can be documented.

In the center of the detail view 710 is a box 730 containing detailed information about the merchant for the transaction 284. The merchant information in the box 730 includes the merchant address along with a street map which can be expanded, the merchant telephone number, store hours and a link to the merchant's website. All of this merchant information in the box 730 is either available in the database 500 or is readily available from the merchant's website or from an Internet search engine. The map or the merchant website may be clicked on to open a new tab or window on a computer running the digital banking system, or open a different app on a mobile device running the digital banking system, in a manner which would be understood by those familiar with web-based systems and mobile apps.

In the design embodiment shown in FIG. 7, along the right side are several actions which may be taken in connection with the transaction 284. One of these actions is to attach a receipt to the transaction. This would offer various options for providing a digital copy of the receipt—such as identifying a file (e.g., image file or pdf) on a computer, or taking or selecting a picture on a mobile device. Attaching a receipt provides a convenient way for the customer to associate the receipt with the transaction, and eliminates the need for the customer to keep the paper receipt. The receipt in the transaction detail of the online banking system may be used later by the customer when returning an item for a refund, or to remind the customer what items were included in the purchase transaction.

Another action which can be taken from the detail view 710 is to dispute the transaction. If the customer is going to dispute a transaction, the customer will normally want to find out as much about the transaction as possible first. The detail view 710 provides significant information about the transaction 284 such that, if the consumer still does not recognize the transaction or wants to dispute the transaction for any other reason, it is most convenient to initiate the dispute from the detail view 710 in the transaction list 700.

Toward the bottom right of the detail view 710 are links allowing the customer to change the category of the transaction, and to add or change/update the tag. Changing the transaction category might be desired by the customer if the automatically-chosen category seems inaccurate—such as a fuel purchase at a gas station which has an attached convenience store, where the transaction is categorized as "grocery", but the customer wants to change the category to "fuel". The tag field is not automatically-populated by the online banking system, so the Add/Update Tag link may be used to assign a tag by the customer, or to change the tag if the customer decides to change tag names or meanings. The detail view 710 may be collapsed by clicking on the up arrow which is located at the upper right.

Figure 8:
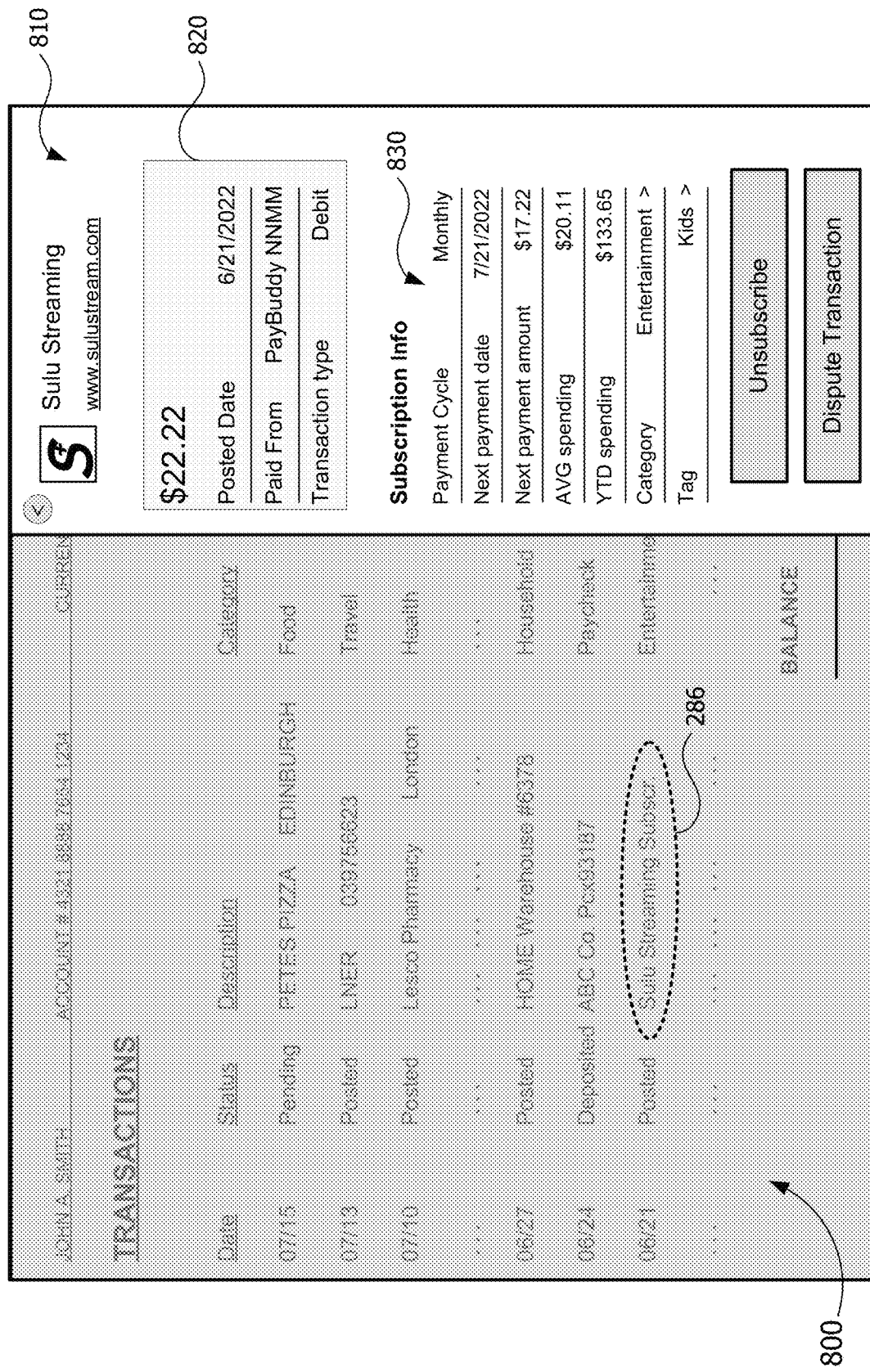
FIG. 8 is a mock-up illustration of a digital banking application in a web browser, depicting a transaction list where a detail view of a transaction is provided with subscription data from the second data source of FIG. 4, according to an embodiment of the present disclosure.

FIG. 8 is a mock-up illustration of a computer display screen running a digital banking application in a web browser, depicting a transaction list 800 where a detail view of a transaction is provided with subscription data from the second data source of FIG. 4, according to an embodiment of the present disclosure. The transaction list 800 of FIG. 8 includes the same transactions as the transaction list 260 of FIG. 2. Also like FIG. 2, the transaction list 800 of FIG. 8 is depicted as being displayed on the computer display screen 258. The subscription details shown in FIG. 8 represent another example of transaction data enrichment which is provided by the database integration and user interface features of the present disclosure.

In the transaction list 800, a detail view 810 is provided for the transaction 286 (from FIG. 2). In the embodiment shown, the detail view 810 is displayed to the right side of the browser window, while the remainder of the transaction list 800 is de-emphasized (e.g., grayed-out). This is just one example of many possible graphical layouts. The detail view 810 could be displayed when the user clicks somewhere on the transaction 286, clicks on an "expand" or right-arrow icon, hovers over the transaction 286, or via any other suitable user interface action programmed into the online banking system. The detail view 810 includes the basic information about the transaction 286 which was available in the line-item display of the transaction list 260, plus details related to the subscription which is associated with the transaction 286.

Some of the data which appears in the detail view 810 is from the bank's own transaction database 400 of FIG. 4, while some of the data in the detail view 810 came from the database 402 provided by an external source. In particular, the details of the subscription were contained in the database 402 from the external source. All of the data in the detail view 810 resides in the combined database 500 of FIG. 5.

In one design embodiment, the detail view 810 includes a section at the top with the name of the company providing the subscription (in this case a video streaming service), along with the company logo and a link to the company website. These data elements were all discussed earlier with respect to the database 402, and were subsequently included in the database 500. A box 820 contains more details about the transaction 286. These include the posted date, the transaction type which in this case is a debit, and a "Paid From:" field which in this case shows a third-party payment handling service and the last few characters of the payment service account number.

A section 830 contains information about the subscription associated with the transaction 286. At the top of the section 830 are a payment cycle (monthly) and a next payment due date (one month later than the transaction 286 itself); these data items were discussed earlier in connection with the database 402. A next payment amount is shown next; this data item could also have been included in the database 402, or could be looked up by the online banking system from the subscription service's website using the customer's account number. The next payment amount due is shown as five dollars less than the current payment of the transaction 286, which could be due to the current payment including a one-time charge for a movie rental, for example.

Other data contained in the section 830 include an average monthly spending amount and a year-to-date spending amount, both of which could be provided in the database 402 from the external source, or which could be looked up in real time by the online banking system. A category (Entertainment) and a tag (Kids) are also listed, along with links which may be used by the customer to change the category and/or the tag. The category and tag data fields, along with reasons for a customer to change them, were discussed earlier.

In the design embodiment shown in FIG. 8, toward the bottom of the detail view 810, is a button to unsubscribe, or cancel the subscription. Clicking on this button would either cause a cancelation notice to be sent to the subscription service, or would follow a link to the subscription service's website or app where the customer may enter some additional information and then would confirm the subscription cancelation. Providing the button the cancel the subscription directly from the transaction list of the online banking system is another example of how the transaction data enrichment provides convenience and simplification for the online banking customer.

Another action which can be taken from the detail view 810 is to dispute the transaction. A customer may wish to dispute any transaction in the transaction list 800, and it is generally desirable for the customer to learn as much about the transaction as possible beforehand. In the case of the subscription transaction, the customer may believe that he or she previously canceled the subscription, but can see from the information in the detail view 810 that in fact the subscription is ongoing, thus leading to the need to dispute the transaction. The detail view 810 may be collapsed by clicking on the left arrow which is located at the upper left of the detail view 810.

The enhanced transaction display features shown in FIGS. 7 and 8 are depicted in a web-based online banking system (i.e., in a web browser window on a computer screen) simply as an example. It is to be understood that the enhanced transaction display features of the present disclosure are also available to users of mobile app-based online banking systems (on smart phones and tablets). Furthermore, the layout of the information on the computer screen or mobile device screen may be rearranged in any suitable manner within the scope of the present disclosure. In other words, when a transaction is selected in order to display transaction detail, the detail box could have any size, shape and location that is deemed suitable (horizontally oriented and below the selected transaction, vertically oriented and to the side, occupying almost the entire screen of a mobile device, etc.). Additionally, it is to be understood that the content of the detail views (data items displayed and actions available), and the positioning of the items, may be changed without departing from the spirit of the present disclosure. The enhanced transaction display features shown in FIGS. 7 and 8 are also applicable to any other customer accounts held at the bank, where each of the accounts may be supplemented with transaction data from external sources, as discussed above with respect to FIGS. 5 and 6.

Figure 9:
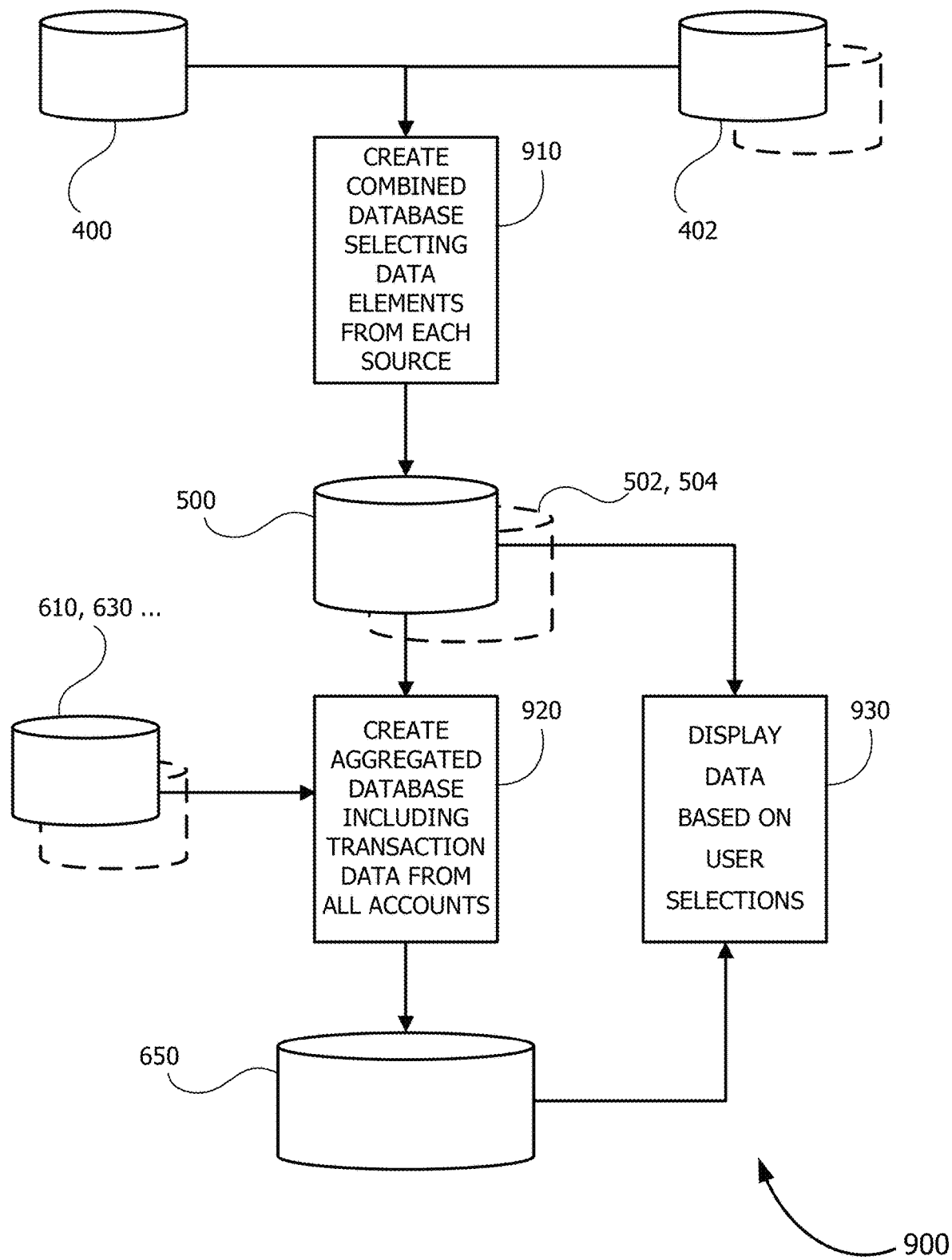
FIG. 9 is a flowchart diagram of a method for integrating transaction data from multiple disparate sources, according to an embodiment of the present disclosure.

FIG. 9 is a flowchart diagram 900 of a method for integrating transaction data from multiple disparate sources, according to an embodiment of the present disclosure. A first database containing transaction data for a first account of a customer is provided, as shown at the top left of FIG. 9. This is the database 400, which is the bank's own transaction database as discussed earlier. The first database contains for each transaction a plurality of transaction attribute data elements—including the transaction date, description, status, amount, category, and so forth. A second database containing transaction data for the first account of the customer is also provided, as shown at the top right. This is the database 402, which is from an external source as discussed earlier. The second database contains for each transaction at least some of the plurality of transaction attribute data elements which were provided in the first database, along with a plurality of merchant attribute data elements, and a plurality of subscription attribute data elements for subscription transactions.

At box 910, a combined database 500 containing transaction data is created for the first account, including selecting for inclusion in the combined database at least some of the transaction attribute data elements from each of the first and second databases, and selecting the merchant attribute data elements and the subscription attribute data elements from the second database. This is the process described earlier in connection with FIG. 5, where common transaction attribute data fields (e.g., date, amount, category) are selected from either the database 400 or the database 402 for inclusion in the combined database 500, and data fields which exist in only one of the source databases (e.g., tag, merchant attributes, subscription attributes) are also included for each transaction in the combined database 500. This results in the combined database 500 containing a superset of all available data for each transaction, and for common data fields containing the data from the source which is considered to be most current or most desirable.

Next, one or more additional databases are provided which contain transaction data for one or more additional accounts of the customer. These are the database 610 and 630 of FIG. 6. There may be only one such additional database (the database 610), or there may be two or more, and possibly many. The databases 610 and 630 contain data for different accounts belonging to the same customer as the combined database 500. To be clear, there may be several external databases (610, 630, etc.) each containing data for one additional customer account, or there may be a single external database containing data for several additional customer accounts, or any combination thereof. Also, there may be more than one customer account included in the database 500, or the other customer accounts at the bank could be contained in other combined databases 502, 504. The point is, there could be multiple external data sources, and multiple additional customer accounts from the bank itself and from other financial institutions, provided at this step.

At box 920, an aggregated database 650 is created, containing the transaction data for the first account from the combined database 500 and the transaction data for the one or more additional accounts from the one or more additional databases (610, 630). The aggregated database 650 also contains data from other customer accounts provided in the database 500 or 502/504. This is the process described earlier in connection with FIG. 6, where each customer account is maintained separately in the database 650, which can be used for financial insights (e.g., cash flow analysis) across all of the customer accounts.

At box 930, data from the combined database 500 and the aggregated database 650 is displayed on a display screen of a user device based on selections made by a user. That is, the user can view enriched transaction data from the combined database 500 (with merchant details, subscription details, etc.) as depicted in FIGS. 7 and 8, and/or the user can view and analyze data across multiple accounts from the aggregated database 650 as depicted at the top of FIG. 6.

It is to be understood that the method of FIG. 9, and the user interface features shown on FIGS. 7 and 8, are programmed as one or more algorithm which runs on the computing system 206 (the enterprise server) cooperatively and interoperably with the computing device 104 and/or the mobile device 106 of the customer. These devices all include processors, memory and communication modules suitable to run the algorithm and perform the digital banking transaction display modifications in the manner described throughout the present disclosure. In particular, the construction of the combined database 500 (selecting transaction data fields from either the database 400 or the database 402), and the construction of the aggregated database 650, may be encoded as algorithms which run on a database server, where the algorithms run either on a periodic basis (e.g., hourly, daily) or whenever a new database is received from one of the external data sources.

Figure 10:
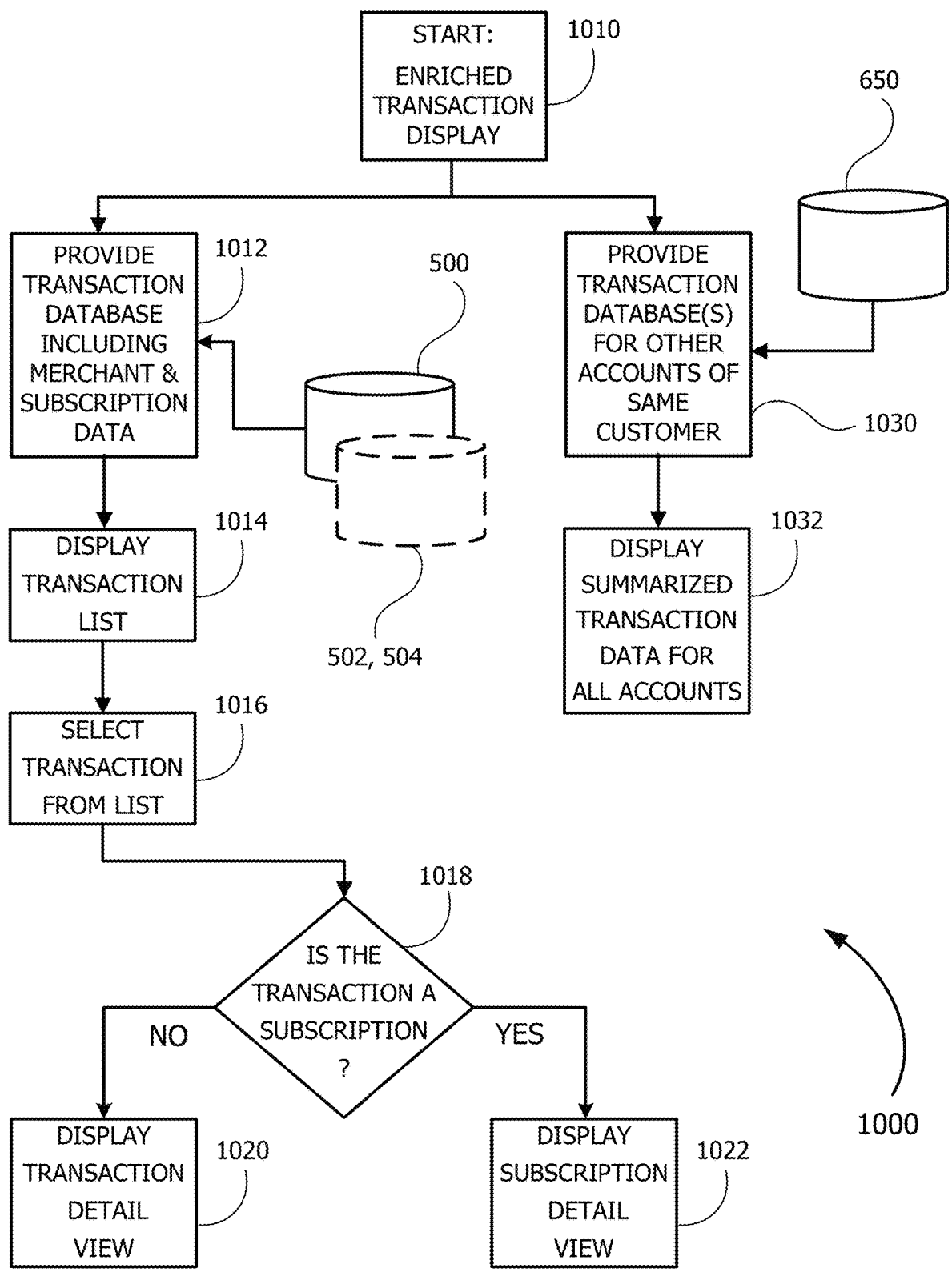
FIG. 10 is a flowchart diagram of a method for enriching the display of transactions in an online banking system using data from multiple sources, according to an embodiment of the present disclosure.

FIG. 10 is a flowchart diagram 1000 of a method for enriching the display of transactions in an online banking system using data from multiple sources, according to an embodiment of the present disclosure. Following a start box 1010, a database of transaction data is provided at box 1012. The database provided at the box 1012 is the combined database 500 of FIG. 5 which was discussed in detail earlier, including transaction attribute data and merchant attribute data, and also subscription attribute data for subscription transactions.

At box 1014, a transaction list is displayed on a user device, which could be a display screen on a computer, or a mobile device such as a smart phone or tablet. The transaction list is typically a line-item list of transactions with basic transaction attributes displayed for each transaction, as shown in FIGS. 2 and 3. At box 1016, a user selects a particular one of the transactions from the transaction list, using the user device. The particular transaction is selected by a gesture such as clicking, hovering, etc., as discussed earlier.

At decision diamond 1018, it is determined whether the particular transaction selected by the user is a subscription payment transaction. If not, then at box 1020 a transaction detail view is displayed on the user device, as depicted in FIG. 7 and discussed earlier. The transaction detail view includes more transaction attributes than were displayed on the transaction list, and also includes merchant attributes such as merchant name (which may be different than a truncated name contained in the transaction description), merchant logo, merchant address and map to the address, merchant phone number, store hours, etc. The transaction detail view also includes selectable actions which may be taken with respect to the particular transaction, including attaching a receipt, disputing the particular transaction, changing the category of the transaction and adding or changing the tag associated with the transaction.

From the decision diamond 1018, if the particular transaction selected by the user is a subscription payment transaction, then at box 1022 a subscription detail view is displayed on the user device, as depicted in FIG. 8 and discussed earlier. The subscription detail view may include more transaction attributes than were displayed on the transaction list, and also includes merchant attributes such as merchant name and merchant logo, and possibly others. The subscription detail view also displays subscription attribute data including the payment cycle, the next payment date and amount, and the year-to-date and average monthly spending on the subscription. The subscription preferably includes a display of the transaction category and tag, with links to change either of these attributes. The subscription detail view also includes other selectable actions which may be taken with respect to the particular transaction, including unsubscribing (canceling the subscription), and disputing the particular transaction. The enriched transaction data display capabilities of the steps 1010-1022 are also applicable to other customer accounts provided in the databases 502, 504 and discussed earlier.

The detail view (transaction detail or subscription detail) may be sized, shaped and positioned on the display of the user device in any suitable fashion, and in most embodiments is configured to partially or completely cover a display of the transaction list on the user device. The display of the detail view may be canceled by a gesture (e.g., clicking a collapse button) by the user on the user device.

At box 1030, the database 650 is provided containing transaction data for other accounts of the same customer. The database 650 often include two or more external accounts in databases 610 and 630, in addition to the combined database 500, along with possibly other internal accounts in the databases 502 and 504. At box 1032, summarized transaction data for all of the accounts is displayed based on user requests. The summarized transaction data may include a cash flow analysis across all of the customer accounts, spending by category (for a single category or multiple categories) across all of the customer accounts, spending by tag (for a single tag or multiple tags) across all of the customer accounts, and spending by merchant (for a single merchant or multiple merchants) across all of the customer accounts.

It is to be understood that the method of FIG. 10, and the user interface features shown on FIGS. 7 and 8, are programmed as one or more algorithm which runs on the computing system 206 (the enterprise server) cooperatively and interoperably with the computing device 104 and/or the mobile device 106 of the customer. These devices all include processors, memory and communication modules suitable to run the algorithm and perform the digital banking transaction display modifications in the manner described throughout the present disclosure.

The preceding discussion has been structured in terms of a single customer and that customer's internal accounts (with the bank business itself) and external accounts (held at other financial institutions). It is to be understood that all of the bank's customers have access to the disclosed database integration and transaction data display enrichment features in the online banking systems, and that all of the account data are correspondingly stored in relation to the appropriate customer, the specific account(s) of that customer, the specific transactions within that account, etc., in a manner which would be understood by those familiar with transactional database systems.

The methods and systems for database integration and transaction data display enrichment, discussed above, provide features which enable customers to easily access the most complete information about any transaction in any account, conveniently take actions which help organize the transaction data efficiently, and view a complete financial picture which offers insights into their accounts held at multiple financial institutions. All of these features are provided in a web-based or app-based system which is familiar to the customer, creating a satisfying simplification and ease of use. This increased customer satisfaction in turn leads to further growth of the bank business and its customer base.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for enriched display of a transaction, said system comprising:
    a user device, where the user device is a computing device configured with an application; and
    a server computer with at least one processor and memory, said server computer being in communication with the user device,
    where the server computer or the user device is configured with an algorithm performing steps including;
    displaying a plurality of transactions on the user device, where each of the transactions includes a set of transaction data elements, a set of merchant data elements and a set of subscription data elements, and the plurality of transactions are contained in a combined database which is constructed from separate databases from at least two data sources, and each data element in the set of transaction data elements, the set of merchant data elements and the set of subscription data elements is selectively chosen from one of the separate databases;
    selecting a transaction, performed by a user using the user device;
    displaying a view of the selected transaction on the user device, where the view is a transaction detail view including a plurality of the transaction data elements and a plurality of the merchant data elements, said transaction data elements and merchant data elements comprising a transaction date, a transaction amount, a transaction posting date, a transaction type, a payment source for the selected transaction, a transaction tag, a transaction category, a merchant name and logo, a merchant address and phone number, a link to a website of the merchant and an interactive map displaying a location of the merchant;
    displaying a subscription detail view for subscription payments, the subscription detail view including a plurality of the transaction data elements, a plurality of the merchant data elements and a plurality of the subscription data elements, and where the subscription detail view includes a transaction posting date, a transaction amount, a transaction type, a payment source for the selected transaction, a transaction tag, a transaction category, a merchant name and logo, a link to a website of the merchant, a payment cycle and a next payment date and amount for the subscription;
    selecting an action, by the user, where the action is directed to one of the transaction data elements, one of the merchant data elements or one of the subscription data elements; and
    performing the action, by the user device or the server computer, including modifying one of the data elements for the selected item; and
    initiating a corresponding action on a networked computer system, including disputing the selected transaction or canceling a subscription corresponding to the selected transaction.

2. A method for providing an enriched display of a transaction, said method being executed by a server computer interoperating with a user device, said method comprising:
    displaying a plurality of items on the user device, where the user device is a computing device configured with an application which communicates with the server computer;
    selecting an item, performed by a user using the user device;
    displaying a view of the selected item on the user device, where the view includes a first, second and third set of data elements about the selected item, and where the first set of data elements includes transaction data elements, the second set of data elements includes merchant data elements and the third set of data elements includes subscription data elements,
    wherein the view of the selected item is a transaction detail view for non-subscription payments, the transaction detail view including a plurality of the transaction data elements and a plurality of the merchant data elements, said transaction data elements and merchant data elements comprising a transaction date, a transaction amount, a transaction posting date, a transaction type, a payment source for the selected transaction, a transaction tag, a transaction category, a merchant name and logo, a merchant address and phone number, a link to a website of the merchant and an interactive map displaying a location of the merchant;

wherein the view of the selected item is a subscription detail view for subscription payments, the subscription detail view including a plurality of the transaction data elements, a plurality of the merchant data elements and a plurality of the subscription data elements, and where the subscription detail view includes a transaction posting date, a transaction amount, a transaction type, a payment source for the selected transaction, a transaction tag, a transaction category, a merchant name and logo, a link to a website of the merchant, a payment cycle and a next payment date and amount for the subscription;

selecting an action, by the user, where the action is directed to one of the data elements from the first, second or third set;

performing the action, by the user device or the server computer, including modifying one of the data elements for the selected item; and initiating a corresponding action on a networked computer system, including disputing a transaction corresponding to the selected item or canceling a subscription corresponding to the selected item.

3. The method according to claim 2 wherein the method is performed in a digital banking system, and where the plurality of transactions are contained in a combined database which is constructed from separate databases from at least two data sources, and each data element in the first, second and third set of data elements is selectively chosen from one of the separate databases.

4. The method according to claim 3 further comprising providing an aggregated database containing data from the combined database and transaction data for at least one account other than an account contained in the combined database, and selecting an analysis action by the user which performs an analysis of the transactions from the first account and the at least one other account, where the analysis action is selected from a group including a cash flow analysis, a spending summary by merchant, and a spending summary by transaction category.

* * * * *